United States Patent
Gaeddert et al.

[15] 3,669,123
[45] June 13, 1972

[54] STOVER SAVER FOR COMBINES

[72] Inventors: Melvin V. Gaeddert, Newton, Kans.; Verlin Wiggers, Bancroft, S. Dak.

[73] Assignee: Hesston Corporation, Hesston, Kans.

[22] Filed: Jan. 19, 1971

[21] Appl. No.: 107,731

[52] U.S. Cl. ..........................................130/27 R, 146/123
[51] Int. Cl. ...........................................A01f 12/40
[58] Field of Search ................130/27 R, 21, 22, 23, 24, 25, 130/26; 146/107, 116, 117, 122, 123

[56] References Cited

UNITED STATES PATENTS

| 2,708,582 | 5/1955 | Adams | 146/123 |
| 2,842,175 | 7/1958 | Thompson | 146/123 |
| 3,103,241 | 9/1963 | Weigel | 146/123 |
| 3,521,687 | 7/1970 | Gaeddert | 146/117 |

Primary Examiner—Antonio F. Guida
Attorney—Schmidt, Johnson, Hovey & Williams

[57] ABSTRACT

A chopper unit secured to a combine centrifugally chops and blows residue received from the strawwalkers of the combine downwardly and rearwardly through the open bottom of the chopper housing into an arcuate receptacle having a rearwardly extending, volute eduction tube at one end thereof, and thence through an upwardly and rearwardly extending spout leading from the tube. The lowermost edge of the front wall of the chopper housing is disposed forwardly of the axis of rotation of the chopper and cooperates with the opposite end of the receptacle to define an inlet through which secondary air currents are drawn. Three species of the invention embody alternative forms of agitated feeder slides which deliver stover from the reciprocating shaker shoe of the combine to the inlet where it is drawn into the receptacle and admixed with the chopped residue for subsequent air conveyance through the tube and the spout. The spout is open along the bottom stretch thereof to permit the induction of outside air thereinto as the admixture travels therethrough.

9 Claims, 7 Drawing Figures

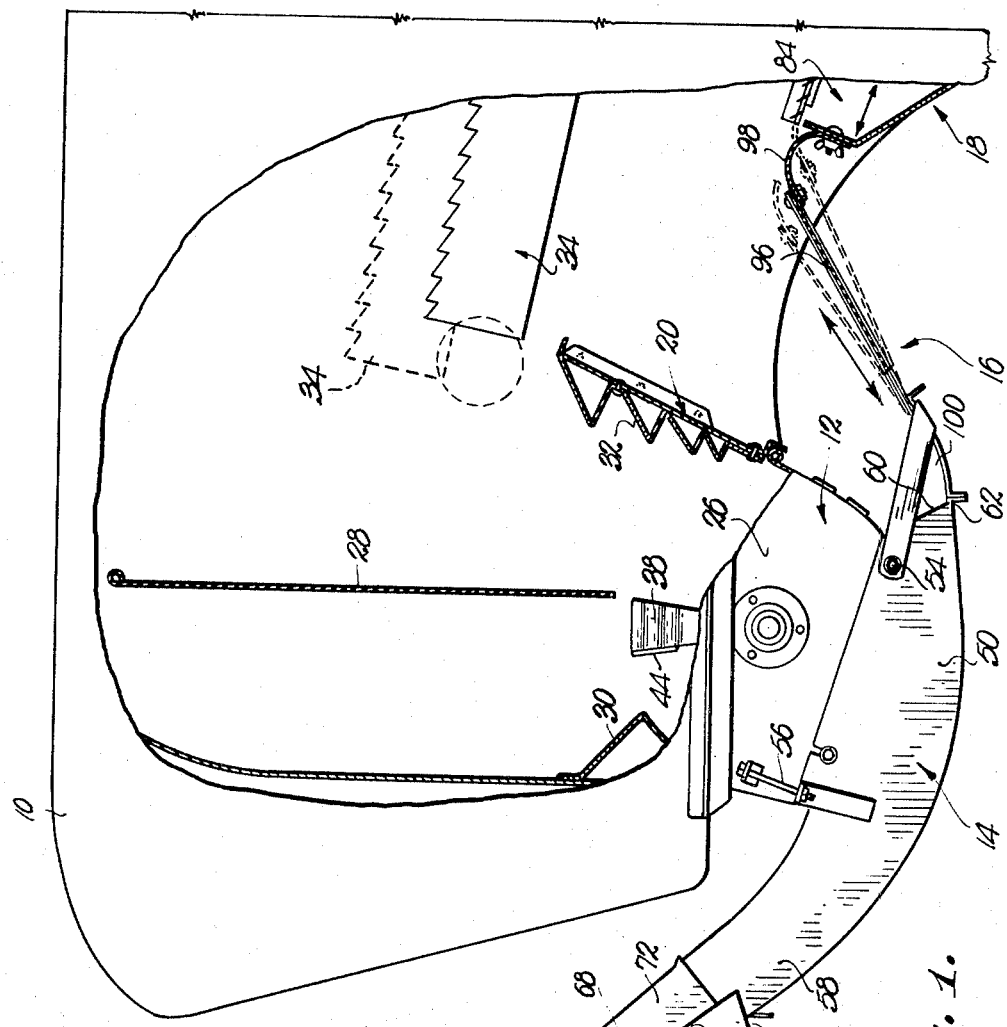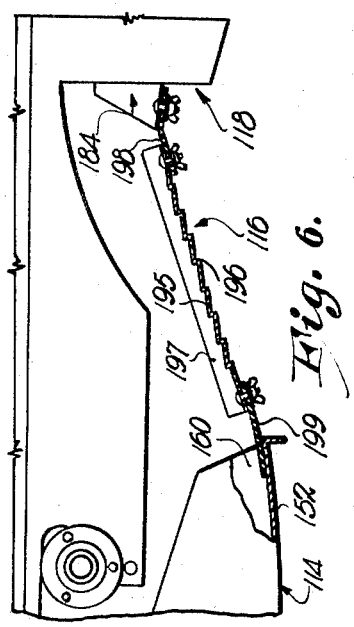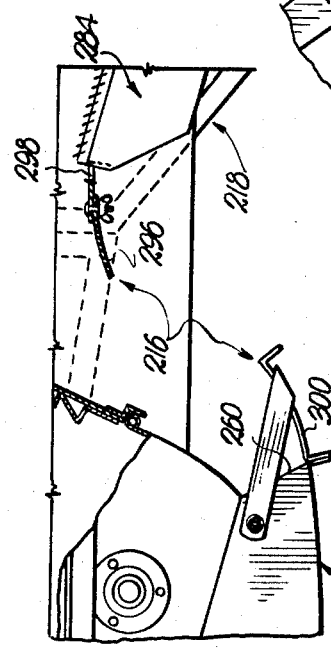

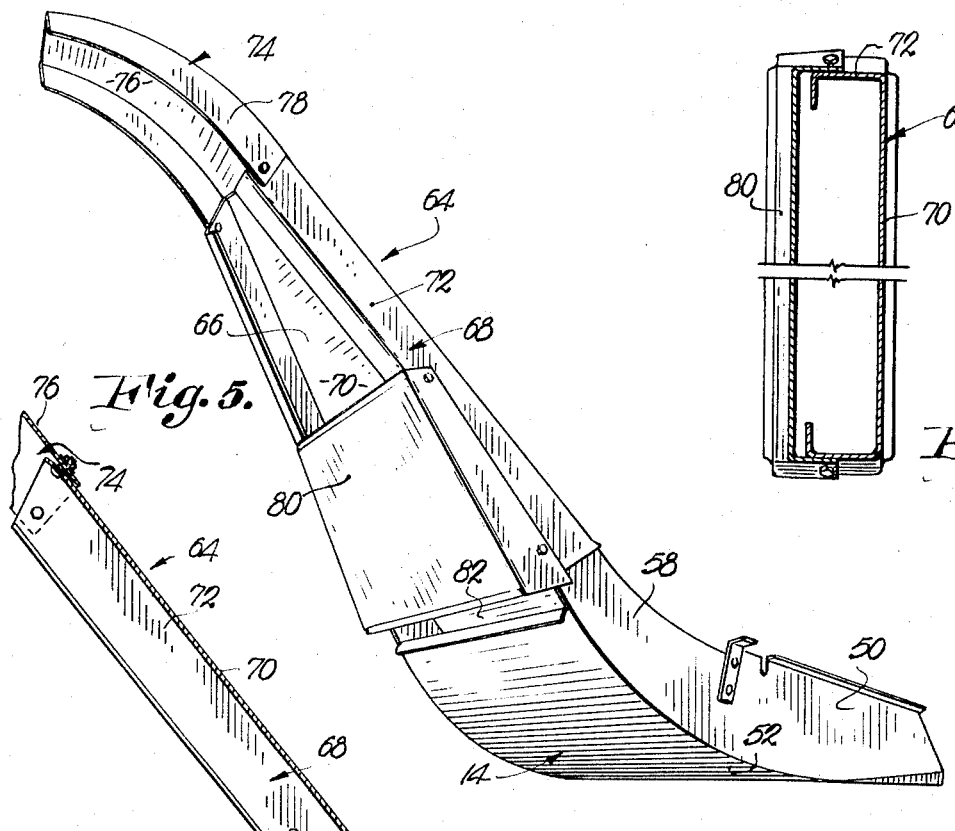
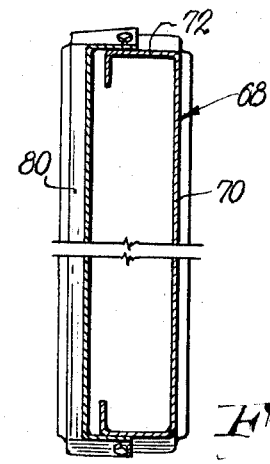
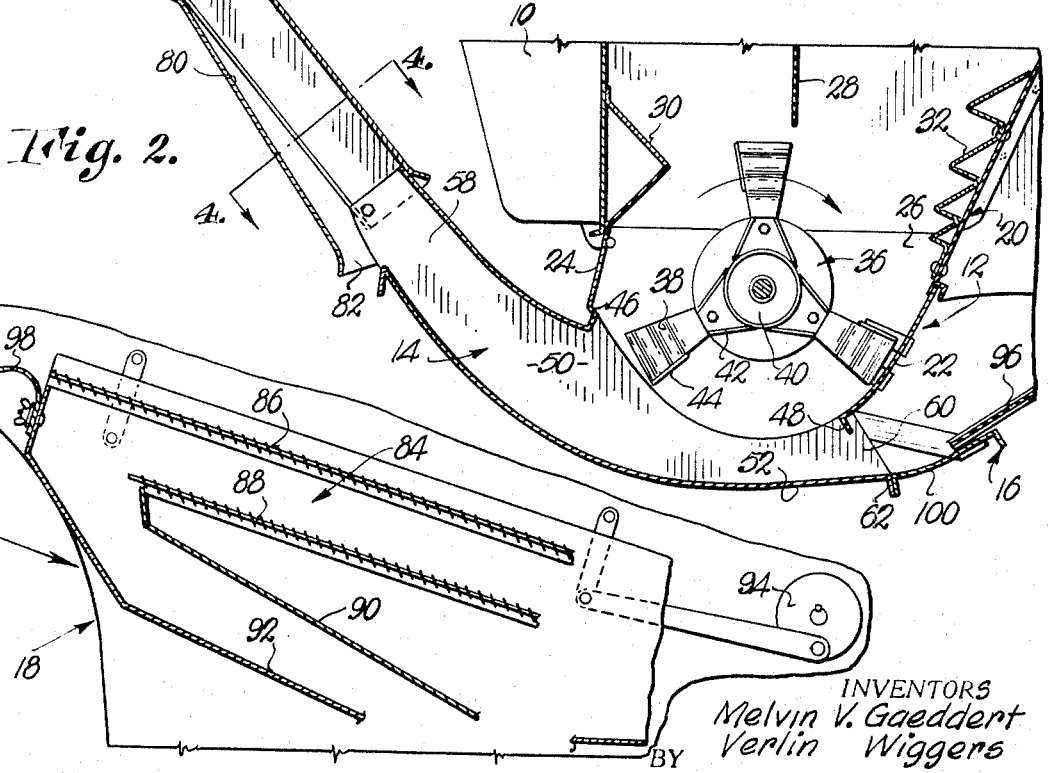

3,669,123

STOVER SAVER FOR COMBINES

This invention relates generally to farm implements and, more particularly, to an attachment for saving valuable stover material that emanates from a combine during operation of the latter.

During combining of small grains, corn, soybeans and the like, straw, cob and foliage residue is separated from the grain by the strawwalkers of the combine and is discharged in a stream through the hood of the combine. Similarly, in another section of the hood, stover material consisting of husks, hulls, shriveled kernels and other particles having nutritional value is cleaned from the grain by the shaker shoe of the combine and is discharged in a second stream through the hood.

In the past it was common practice to simply allow the residue and stover to fall to the ground as the combine advanced, although in some instances it was necessary or desirable to first pass the residue through a chopper attachment. In any event, it is manifest that such practice wasted the valuable nutritional aspects of the discarded stover, particularly on those days when the humidity and moisture content of the harvested crop caused even whole kernels of the grain to be inadvertently discharged as stover.

Therefore, it is an important object of the present invention to utilize the heretofore wasted nutritional qualities of stover by collecting the latter as it emanates from cleaning mechanism of the combine in one stream and simultaneously mixing the stover with residue issuing in another stream from a chopper on the combine to produce an inexpensive, yet highly nutritious fodder for livestock.

Another important object of this invention is the provision of structure for carrying out the above object which advantageously utilizes the centrifugal blowing action of the chopper as well as the reciprocating motion of the cleaning mechanism in effecting delivery of the stover from the mechanism and admixture with the residue.

A further important object of the instant invention is to provide structure as aforesaid which is inexpensive to manufacture, yet is efficient and reliable in operation.

A still further important object of this invention is to provide a novel, open-bottom delivery spout as part of said structure which serves to guide the residue-stover admixture to a selected point of delivery without any clogging whatever.

Yet another important aim of the present invention is to provide structure as above set forth which is capable of being readily adapted for use on various makes and models of combines.

In the drawings:

FIG. 1 is a fragmentary, elevational view of a combine hood having one embodiment of stover saving apparatus constructed in accordance with the principles of the present invention attached thereto, the hood being broken away and parts being shown in cross section for clarity;

FIG. 2 is a fragmentary, vertical cross-sectional view of the stover saving apparatus of FIG. 1;

FIG. 3 is a fragmentary, schematic, vertical cross-sectional view of the cleaning mechanism within the combine of FIG. 1;

FIG. 4 is an enlarged, fragmentary, cross-sectional view taken along line 4—4 of FIG. 2;

FIG. 5 is a perspective view of the receiver and spout of the apparatus shown in FIG. 1;

FIG. 6 is a fragmentary, elevational view of a second embodiment of the invention on a different combine illustrating in cross section the stover feeding structure suited for that combine; and FIG. 7 is a fragmentary, elevational view of a third embodiment of the invention on a third type of combine, the stover feeding structure being shown in cross section for clarity.

In FIGS. 1 and 2 the hood 10 of a combine has stover saving apparatus of the present invention attached thereto, the apparatus broadly comprising a straw chopping unit 12 at the residue outlet of hood 10, a collector 14 underlying unit 12, and structure 16 for feeding stover from the cleaning mechanism 18 of the combine into collector 14.

The unit 12 may take the form of any suitable chopping unit such as the types described in U. S. Letters Pat. Nos. 2,986,186, issued May 30, 1961, and 3,521,687, issued July 28, 1970. The chopping unit described in the latter Patent is particularly suited for handling the heavy foliage and cobs incident to corn combining and, by way of example, certain of the equipment associated with such chopping units is illustrated in the drawings. In particular, unit 12 includes an open top hopper 20 having spaced-apart front and rear walls 22 and 24 respectively which are secured to and extend upwardly into hood 10, a pair of spaced sidewalls 26 interconnecting walls 22 and 24, a baffle 28 depending from hood 10 through the top of hopper 20, a triangular deflector 30 on rear wall 24, and sawtooth deflectors 32 on front wall 22. The baffle 28, deflector 30, and sawtooth deflectors 32 all serve to direct and maintain the corn residue issuing from walkers 34 within the reach of the rotor 36 of unit 12, all as is clearly taught in U.S. Pat. No. 3,521,687.

The rotor 36 of unit 12 has a number of elongated, transversely corrugated, free-swinging chopping elements 38 which are mounted on axle 40 by means of individual saddles 42, and certain of the elements 38 (preferably three at each end of axle 40 and three in the center thereof) are provided with elongated, flat vanes 44 on the trailing edges thereof to augment the blowing action of the chopper as it rotates between sidewalls 26 about a horizontal axis through axle 90.

Hopper 20 has a discharge opening across the entire bottom thereof which spans the distance between sidewalls 26 and extends from the lowermost edge 46 of rear wall 24 to the lowermost edge 48 of front wall 22, the edge 48 being disposed in a vertical plane which is positioned substantially forwardly of the axis of rotation of axle 40 as is clear in FIG. 2.

The collector 14 underlying hopper 20 is in the nature of an open top trough having a pair of upstanding side panels 50 and an elongated, longitudinally arcuate bottom pan 52 interconnecting panels 50, the latter completely encompassing the discharge opening of hopper 20 and being pivotally secured to sidewalls 26 at 54 to space the pan 52 a distance below the hopper discharge opening. A releasable latch 56 (FIG. 1) maintains collector 14 in its operative position. Collector 14 also has at one end thereof, a volute, rearwardly opening eduction tube 58 which extends upwardly and rearwardly from edge 46 of rear wall 24, the panels 50 and pan 52 merging with tube 58 at the lower regions of the latter.

At the opposite end of the collector 14 is a forwardly opening inlet 60 which extends downwardly from edge 48 to the opposite end 62 of pan 52. Note that because of the positioning of edge 48 forwardly of the axle 40, inlet 60 is similarly disposed and is in close, substantially direct communication with the discharge opening of hopper 20. Moreover, the outer tip portions of elements 38 project downwardly through the discharge opening closely adjacent inlet 60 during rotation of rotor 36.

An elongated, tapered spout 64 having a longitudinally extending air inlet slot 66 along the bottom thereof is secured to the upturned end of tube 58 and extends upwardly and rearwardly therefrom. Spout 64 includes an elongated, straight, generally U-shaped section 68 provided with an upper wall 70 and a pair of sidewalls 72 which diverge as tube 58 is approached and partially define the slot 66 along their lower edges. An arcuate, transversely U-shaped discharge section 74 is secured to the uppermost end of straight section 68 and has a back wall 76 and a pair of downwardly extending sidewalls 78 which diverge as the section 68 is approached and further define slot 66. An elongated, U-shaped deflector 80 is secured to the straight section 68 across slot 66 in an angularly offset manner such that the flat bottom surface thereof projects away from the longitudinal axis of section 68 as tube 58 is approached. The lower margin of deflector 80 is slightly outturned and spaced away from tube 58 to define an air opening 82.

The cleaning mechanism 18 schematically illustrated in FIG. 3 is representative of but one of several forms which such cleaning mechanism may take. As illustrated, mechanism 18 is spaced vertically and forwardly of collector 14 and includes a shaker shoe 84 which is mounted on the body of the combine for reciprocation in the direction of the arrow illustrated in FIG. 3. Shaker shoe 84 has an inclined, top chaffer screen 86 which overlies a clean grain sieve 88, a ramp 90 leading to a clean grain elevator (not shown), and a second ramp 92 which leads to a tailings return elevator (not shown). Mechanism 18 also includes an eccentric crank assembly 94 operably coupled with shoe 84 for supplying driving power to the latter.

The feeding structure 16 between shaker shoe 84 and collector 14 comprises a slide 96 constructed from flexible sheet material which extends forwardly and upwardly beyond inlet 60. The upper end of slide 96 is coupled with the rearmost end of shaker shoe 84 by means of an arcuate, spring-like bracket 98, while the opposite, lower end of the slide 96 is disposed in close proximity to inlet 60, resting upon an arcuate shelf 100 which is rigid to pan 52 and projects outwardly and upwardly from inlet 60. Therefore, it may be seen that slide 96 effectively bridges the gap between the uppermost rear end of shaker shoe 84 and inlet 60.

FIG. 6 shows a second embodiment of the stover-saving apparatus which is designed to function properly in combines of the particular type illustrated. All of the components of the saving apparatus for the combine in FIG. 6 are substantially identical to those of the first embodiment, except for the feeding structure 116 which is designed to accommodate the decreased vertical spacing between the upper rear end of shaker shoe 184 of cleaning mechanism 118 and inlet 160 of collector 114.

Structure 116 comprises a slide 196 which is coupled at its upper end with shaker shoe 184 by a hinged or flexible bracket 198 and has a series of laterally extending steps 195 which lead from bracket 198 toward the lower end of slide 196. A pair of elongated, upstanding guide plates 197 (one only of which is shown) extend along opposite sides of slide 196, and a flexible flap 199 secured to the lowermost of the steps 195 slidably rests within the inlet 160 on pan 152.

FIG. 7 illustrates a third embodiment of stover-saving apparatus which is designed for use on yet another style of combine wherein the shaker shoe 284 of cleaning mechanism 218 is spaced a greater distance above inlet 260 of collector 214 than the corresponding shaker shoes of the first two embodiments. Once again, the components of the saving apparatus for the combine of FIG. 7 are substantially identical to the components of the embodiments previously described, except for the details of construction of feeding structure 216.

In particular, structure 216 includes a short slide 296 which is constructed from flexible material and is coupled at its uppermost end with the shaker shoe 284 by a rigid bracket 298. As clearly shown in FIG. 7, slide 296 terminates in a lowermost free end which is spaced vertically above and forwardly of the inlet 260 and receiving shelf 300.

The operating characteristics of all three of the embodiments of the invention are basically identical, although each of the three feeding structures handles the stover in a slightly different manner. Therefore, only the operation of the first embodiment will be described in detail, with appropriate references being made to the other embodiments where necessary.

During operation of the combine and as the latter advances across the field, the strawwalkers 34 separate kernels of the harvested grain from the coarse straw and foliage residue and discharge the latter in a stream through hood 10 toward hopper 20. Simultaneously, the separated kernels are delivered by means not shown to the cleaning mechanism 18 where the reciprocating shaker shoe 84 operates to further process the kernels by removing husks, hulls, shriveled kernels and the like therefrom, all of the stover material thus removed then being displaced toward the rear of the combine by shoe 84 where it issues in a second stream through hood 10.

Actuation of chopping unit 12 causes rotor 36 to rotate in a clockwise direction viewing FIGS. 1 and 2 such that residue entering hopper 20 and gravitating therethrough is thoroughly chopped and shredded by elements 38 to reduce the residue to particulate material. Then the particulate material is centrifugally propelled through the discharge open-ing of the hopper 20 and into collector 14 along a path of travel extending substantially at a tangent to the lower arcuate portion of front wall 22.

In addition to producing particulate material from the residue, the rotor 36 also creates, with the aid of vanes 44, a primary blast of air flowing from hood 10, centrifugally of axle 40 through hopper 20, and out the discharge opening of the latter along pan 52 into eduction tube 58. The blast then continues upwardly through spout 64 and out discharge section 74, thereby giving further impetus to the material issuing from unit 12 in addition to the momentum physically supplied thereto during impact with the elements 38. This primary blast rushing past inlet 60 induces secondary airstreams flowing from the exterior of collector 14 thereinto through inlet 60 whereupon they merge with the primary blast and travel therewith through tube 58 and spout 64.

It is also significant to note that the secondary airstreams are not created solely through inducement by the primary blast. That is, because of the large size of the hopper discharge opening and the positioning of front wall edge 48 relative to rotor 36 the peripheral portions of elements 38 and vanes 44 dip through the opening into collector 14 dur-ing rotation. Therefore, elements 38 operate to directly draw secondary air in through inlet 60 in addition to inducing such streams by creation of the primary blast.

Because of the reciprocating movement of shaker 84, slide 96 is continuously agitated and tipped between the phantom positions illustrated in FIG. 1. This action causes stover emanating from shoe 84 and landing on slide 96 to travel down the latter and onto shelf 100 where it is immediately carried through inlet 60 by the secondary airstreams for admixture with the particulate material within collector 14. Then the admixture is blown upwardly through tube 58 into spout 64 and out discharge section 74.

It is important to note at this juncture that the special configuration of spout 64 greatly facilitates the conveyance of the admixture from the collector 14. In this regard, the tapered form of spout 64 aids in directing the blown admixture toward the precise location desired, while the continuous inlet slot 66 along the bottom thereof permits airflow into spout 64 to alleviate any clogging which might otherwise tend to occur at the discharge 74 because of such tapering. This special configuration of spout 64 is possible because it has been found that during its travel through spout 64, the admixture moves primarily along the walls 70 and 76.

In certain limited instances, particles of the admixture may not be fully swept up within the main thrust of the airstream through tube 58 or have sufficient momentum to be propelled through the entire length of the spout 64. In this case, such particles will strike the deflector 80 and rebound back into the airstream to be thereafter swept along toward discharge 74. It is to be noted that the deflector 80, while serving this important function, does not enclose any more of the spout 64 than is necessary for the performance of this function. Therefore, the presence of deflector 80 does not appreciably lessen the flow of induced air through slot 66 and air opening 82.

In FIG. 6, the steps 195 on slide 196 augment the feeding action of structure 116 as stover emanates from shaker shoe 184. To this end, because of the relative short vertical distance between shoe 184 and inlet 160, the overall angle of inclination of slide 196 is less than the angle of repose of stover material landing thereon. Accordingly, without the presence of steps 195, such stover would not properly advance down slide 196 during agitation and tipping of the latter by the shoe 184.

In FIG. 7, because of the greater vertical distance between shoe 284 and inlet 260 than in the previous embodiments, there is no need to completely bridge the gap therebetween. Accordingly, stover emanating from shoe 284 slides downwardly along the relatively short length of slide 296 and then gravitates onto the shelf 300 where it is sucked into inlet 260 for subsequent admixture.

It should now be readily apparent that all three of the above described embodiments of stover saving apparatus are equally capable of carrying out the objects of the invention as originally set forth. By using the novel apparatus it is now possible to utilize the harvested crop to an extent which has not heretofore been possible. Moreover, this can be readily accomplished by merely attaching the apparatus to existing combines without the need for extensive modification and without unduly complicating the harvesting and threshing processes.

Having thus described the invention, what is claimed as new and desired to be secured by Letters Patent is:

1. In combination with an agricultural combine having an open bottom hood through which coarse crop residue and fine stover are discharged in separate streams,
   a chopping unit carried by the hood and including:
   a hopper having a front wall, a rear wall spaced from the front wall, a pair of spaced sidewalls interconnecting the front and rear walls, and an open top disposed to receive said residue, and
   a horizontal chopper rotatably carried by said sidewalls therebetween for reducing said residue to particulate material and for creating a blast of primary air,
   said hopper having a lowermost discharge opening spanning the distance between the sidewalls and extending from the lowermost edge of the front wall to the lowermost edge of the rear wall, through which said material and said blast of air flow,
   said lowermost edge of the forward wall being within a vertical plane disposed forwardly of the axis of rotation of the chopper;
   a collector carried by the hopper and including:
   an open top trough having a volute, rearwardly opening, eduction tube at one end of the trough extending upwardly and rearwardly from said lowermost edge of the rear wall of the hopper,
   said trough being provided with a pair of side panels and an elongated, longitudinally arcuate, bottom pan interconnecting the panels, spaced below said discharge opening of the hopper, and merging at one end of the pan with said tube,
   said trough having a forwardly opening inlet extending from said lowermost edge of the front wall of the hopper downwardly to the opposite end of said pan for receiving secondary currents of air created by the blast of primary air flowing through the discharge opening into the trough; and
   structure at said opposite end of the pan extending forwardly beyond said inlet of the trough for receiving said stover from the hood and directing the same into said secondary currents of air for projection thereby rearwardly through the trough and admixture with said material being ejected through the tube.

2. The invention as claimed in claim 1; and an elongated spout extending upwardly and rearwardly from said tube for guiding the material and stover to a point of delivery, said spout having a longitudinally extending slot in the bottom thereof for free flow of induced air into the spout.

3. The invention as claimed in claim 2, wherein said spout progressively increases in cross-sectional area as the tube is approached.

4. The invention as claimed in claim 3, and means underlying the slot for deflecting the material and the stover toward the top of the spout.

5. The invention as claimed in claim 4, wherein is provided a space between said deflecting means and the tube for flow of air into the spout.

6. The invention as claimed in claim 1, wherein said chopper is provided with chopping elements disposed to project through said discharge opening of the hopper during rotation of the chopper for augmenting the flow of air, material and stover through the trough and its tube.

7. The invention as claimed in claim 1, wherein said structure includes a shelf rigid to the pan and an element supported at one end thereof by said shelf and coupled at the opposite end thereof with movable mechanism forming a part of the combine for imparting a stover-advancing action to said element.

8. The invention as claimed in claim 1, wherein said structure includes an element supported at one end thereof by said pan and coupled at the opposite end thereof with movable mechanism forming a part of the combine for imparting a stover-advancing action to said element.

9. The invention as claimed in claim 1, wherein said structure includes a shelf rigid to the pan and an element coupled with movable mechanism forming a part of the combine for imparting a stover-advancing action to said element.

* * * * *